US010611084B2

(12) United States Patent
de Pena et al.

(10) Patent No.: US 10,611,084 B2
(45) Date of Patent: Apr. 7, 2020

(54) REFLECTOR AND ADDITIVE MANUFACTURING SYSTEM

(71) Applicant: HEWLETT-PACKARD DEVELOPMENT COMPANY, L.P., Houston, TX (US)

(72) Inventors: Alejandro Manuel de Pena, Sant Cugat del Valles (ES); Ferran Esquius Berengueras, Sant Cugat del Valles (ES); Esteve Comas, Sant Cugat del Valles (ES); Arthur H. Barnes, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/093,870

(22) PCT Filed: May 10, 2017

(86) PCT No.: PCT/US2017/032007
§ 371 (c)(1),
(2) Date: Oct. 15, 2018

(87) PCT Pub. No.: WO2017/197015
PCT Pub. Date: Nov. 16, 2017

(65) Prior Publication Data
US 2019/0084234 A1 Mar. 21, 2019

(30) Foreign Application Priority Data

May 12, 2016 (GB) .................................. 1608358.6

(51) Int. Cl.
*F21V 21/00* (2006.01)
*B29C 64/282* (2017.01)
(Continued)

(52) U.S. Cl.
CPC ........ *B29C 64/282* (2017.08); *B29C 35/0805* (2013.01); *B29C 64/165* (2017.08);
(Continued)

(58) Field of Classification Search
None
See application file for complete search history.

(56) References Cited

U.S. PATENT DOCUMENTS 4,089,047 A    5/1978   Lubertiz
4,605,839 A * 8/1986   Rasmussen .......... H05B 3/0057
                                                                                                                   392/420
(Continued)

FOREIGN PATENT DOCUMENTS

CN        1850494       10/2006
EP         0299336        1/1989
(Continued)

OTHER PUBLICATIONS

Clinto, Han; "Wax-Powder Sintering for Lost Wax Casting"; Oct. 14, 2008; http://forums.reprap.org/read.php?70,17736.

*Primary Examiner* — Vip Patel
(74) *Attorney, Agent, or Firm* — HP Inc. Patent Department

(57) ABSTRACT

A reflector includes a first reflector section and a second reflector section. The first reflector section extends along a portion of a first ellipse. The second reflector section extends along a portion of a second ellipse, the second ellipse intersecting the first ellipse. The first reflector section and the second reflector section are joined at an intersecting point of the first ellipse and the second ellipse.

19 Claims, 16 Drawing Sheets

(51) Int. Cl.
  *B33Y 30/00* (2015.01)
  *B29C 64/295* (2017.01)
  *B29C 35/08* (2006.01)
  *B29C 64/209* (2017.01)
  *B29C 64/165* (2017.01)
  *B29L 11/00* (2006.01)
  *B33Y 10/00* (2015.01)

(52) U.S. Cl.
  CPC .......... *B29C 64/209* (2017.08); *B29C 64/295* (2017.08); *B33Y 30/00* (2014.12); *B29C 2035/0822* (2013.01); *B29L 2011/0083* (2013.01); *B33Y 10/00* (2014.12)

(56) References Cited

U.S. PATENT DOCUMENTS

| | | | |
|---|---|---|---|
| 5,740,314 A * | 4/1998 | Grimm | B29C 35/08 219/405 |
| 5,757,479 A | 5/1998 | Haga et al. | |
| 7,261,542 B2 | 8/2007 | Hickerson et al. | |
| 7,286,296 B2 | 10/2007 | Chaves et al. | |
| 9,120,273 B2 * | 9/2015 | Jilken | B29B 9/14 |
| 2005/0094401 A1 | 5/2005 | Magarill | |
| 2012/0307502 A1 | 12/2012 | Walton | |
| 2015/0028020 A1 | 1/2015 | Childers | |

FOREIGN PATENT DOCUMENTS

| | | |
|---|---|---|
| EP | 1647855 | 4/2006 |
| EP | 2574837 A2 | 4/2013 |
| EP | 2685237 | 1/2014 |
| GB | 2412723 | 10/2005 |
| JP | S61134089 | 6/1986 |
| JP | 2010027407 | 2/2010 |
| RU | 2089780 C1 | 9/1997 |
| WO | WO-2014144255 A2 | 9/2014 |
| WO | WO-2015056230 | 4/2015 |

* cited by examiner

REFLECTOR AND ADDITIVE MANUFACTURING SYSTEM

BACKGROUND

Additive manufacturing systems enable the generation of three-dimensional objects on a layer-by-layer basis.

BRIEF DESCRIPTION OF THE DRAWINGS

Examples will now be described, by way of non-limiting example, with reference to the accompanying drawings, in which:

FIG. 6 illustrates a graph illustrating a power density distribution for the energy source of FIG. 3 having two lamps turned on;

FIG. 7 illustrates a graph illustrating a power density distribution for the energy source of FIG. 3 having one lamp turned on;

DETAILED DESCRIPTION

Three dimensional (3D) printing, also referred to as additive manufacturing, rapid prototyping or solid freeform fabrication, is a technology for manufacturing a vast variety of objects. Some additive manufacturing systems generate three-dimensional objects through the selective solidification of successive layers of a build material, such as a powdered build material. Some of such systems may solidify portions of a build material by selectively depositing an agent to a layer of build material. Some systems, for example, may use a liquid binder agent to chemically solidify build material where the liquid binder agent is applied.

Other systems, for example, may use liquid energy absorbing agents, or coalescing agents, that cause build material to solidify when suitable energy, such as infra-red energy, is applied to build material on which an energy absorbing or coalescing agent has been applied. The temporary application of energy may cause portions of the build material on which coalescing agent has been delivered, or has penetrated, to absorb energy. This in turn causes these portions of build material to heat up above the melting point of the build material and to coalesce. Upon cooling, the portions which have coalesced become solid and form part of the three-dimensional object being generated.

Other systems may use additional agents, such as coalescence modifier agents, in conjunction with coalescing agents. A coalescence modifier agent is agent that serves, for example, to modify the degree of coalescence of a portion of build material on which the coalescence modifier agent has been delivered or has penetrated.

The production of a three-dimensional object through the selective solidification of successive layers of build material may involve a set of defined operations. An initial process may, for example, be to form a layer of build material from which a layer of the three-dimensional object is to be generated. A subsequent process may be, for example, to selectively deposit an agent to selected portions of a formed layer of build material. In some examples, a further subsequent process may be to supply energy to the build material on which an agent has been deposited to solidify the build material in accordance with where the agent was deposited. Repeating these processes enables a three-dimensional object to be generated layer-by-layer, through selective solidification of portions of successive layers of build material.

Figure 1:
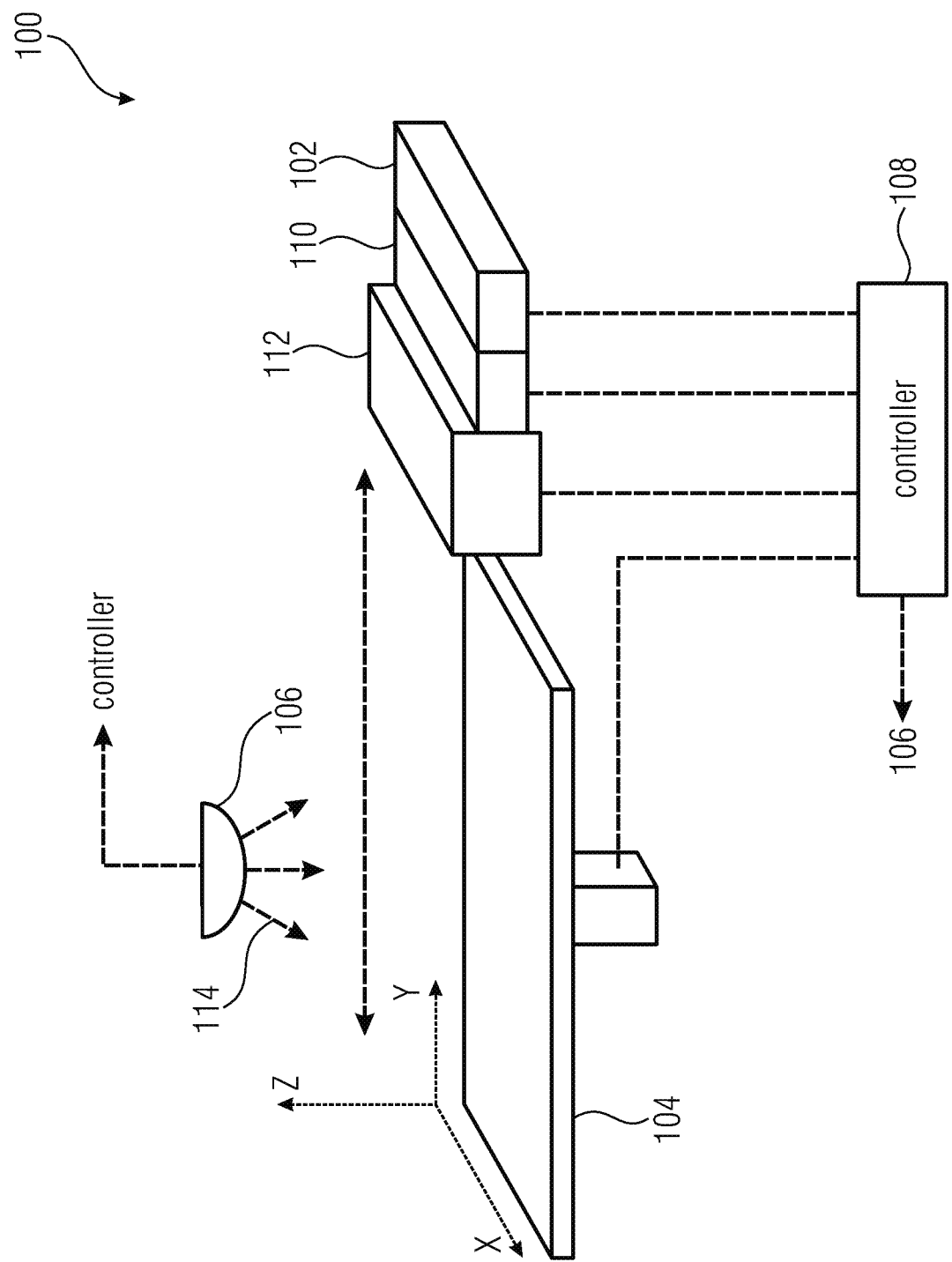
FIG. 1 illustrates a 3D printer of an additive manufacturing system according to an example.

FIG. 1 is a simplified isometric illustration of an additive manufacturing system 100 according to an example. The build material may be a powder-based build material. A powder-based material may be a dry or wet powder-based materials, a particulate material, or a granular material. In some examples, the build material may include a mixture of air and solid polymer particles, for example at a ratio of about 40% air and about 60% solid polymer particles. Other examples of suitable build materials may include a powdered metal material, a powdered composite material, a powder ceramic material, a powdered glass material, a powdered resin material, a powdered polymer material, and combinations thereof. In other examples the build material may be a paste, a liquid, or a gel.

The additive manufacturing system 100 includes a coalescing agent distributor 102 to selectively deliver a coalescing agent to successive layers of build material provided on a support member 104, an energy source 106 and a controller 108 to control the selective delivery of coalescing agent to a layer of provided build material.

A suitable coalescing agent may be an ink-type formulation comprising carbon black. Such an ink may additionally comprise an absorber that absorbs the radiant spectrum of energy emitted by the energy source 106. For example, the ink may additionally comprise an infra-red light absorber, a near infra-red light absorber, a visible light absorber or a UV light absorber. The support member 104 may be a fixed part of the additive manufacturing system, or may not be a fixed part of the additive manufacturing system, instead being, for example, a part of a removable module.

The agent distributor 102 may be a printhead, such as thermal printhead or piezo inkjet printhead. The printhead may have arrays of nozzles. In other examples, the agents may be delivered through spray nozzles rather than through printheads. In some examples the printhead may be a drop-on-demand printhead. In other examples the printhead may be a continuous drop printhead. The agent distributor 102 may be an integral part of the additive manufacturing system 100 or may be user replaceable. The agent distributor 102 may extend fully across the support member 104 in a so-called page-wide array configuration. In other examples, the agent distributor 102 may extend across a part of the support member 104. The agent distributor 102 may be mounted on a moveable carriage to enable it to move bi-directionally across the support member 104 along the illustrated y-axis. This enables selective delivery of coalescing agent across the entire support member 104 in a single pass. In other examples the agent distributor 102 may be fixed, and the support member 104 may move relative to the agent distributor 102.

In some examples, there may be an additional coalescing agent distributor 110. The coalescing agent distributors 102, 110 may be located on the same carriage, either adjacent to each other or separated by a short distance. In other examples, two carriages each may contain coalescing agent distributors 102, 110. In some examples, the additional coalescing agent distributor 110 may deliver a different coalescing agent than the coalescing agent distributor 102.

The additive manufacturing system 100 further includes a build material distributor 112 to provide, e.g. deliver or deposit, successive layers of build material on the support member 104. Suitable build material distributors 112 may include a wiper blade and a roller. Build material may be supplied to the build material distributor 112 from a hopper or build material store. In the example shown the build material distributor 112 moves along the y-axis of the support member 104 to deposit a layer of build material. A layer of build material will be deposited on the support member 104, and subsequent layers of build material will be deposited on a previously deposited layer of build material. The build material distributor 112 may be a fixed part of the additive manufacturing system 100, or may not be a fixed part of the additive manufacturing system 100, instead being, for example, a part of a removable module.

In the example shown the support member 104 is moveable in the z-axis such that as new layers of build material are deposited a predetermined gap is maintained between the surface of the most recently deposited layer of build material and lower surface of the agent distributor 102. In other examples, however, the support member 104 may not be movable in the z-axis and the agent distributor 102 may be movable in the z-axis.

The energy source 106 applies energy 114 to build material to cause a solidification of portions of the build material, for example to portions to which an agent, e.g., coalescing agent, has been delivered or has penetrated. In some examples, the energy source 106 is an infra-red (IR) radiation source, a near infra-red radiation source, or a halogen radiation source. In some examples, the energy source 106 applies energy in a substantially uniform manner to the whole surface of a layer of build material, and a whole layer may have energy applied thereto simultaneously, which may increase the speed at which a three-dimensional object may be generated. In other examples, the energy source 106 applies energy in a substantially uniform manner to a portion of the whole surface of a layer of build material. For example, the energy source 106 may apply energy to a strip of the whole surface of a layer of build material. In these examples the energy source 106 may be moved or scanned across the layer of build material such that a substantially equal amount of energy is ultimately applied across the whole surface of a layer of build material. In some examples, the energy source 106 may be mounted on the moveable carriage. In other examples, the energy source 106 may apply a variable amount of energy as it is moved across the layer of build material, for example in accordance with agent delivery control data. For example, the controller 108 may control the energy source 106 to apply energy to portions of build material on which coalescing agent has been applied.

The energy source includes a lamp or another radiation element to add or supply the energy to the build material or powder. Two lamps side-by-side may double the power per unit area. To produce the three-dimensional object the energy is added to keep the powder at a desired temperature. Two lamps may create hot spots at locations where the radiation profiles of the two lamps overlap. At the ends of a lamp the radiation profile may be different than along the length of the lamp causing an irradiation flux or radiation profile to be lower at the ends when compared to the area between the ends of the lamp. Some lamps may include tungsten and to avoid blackening of the lamp due to tungsten condensation the lamp is operated above 300° C.

Figure 2:
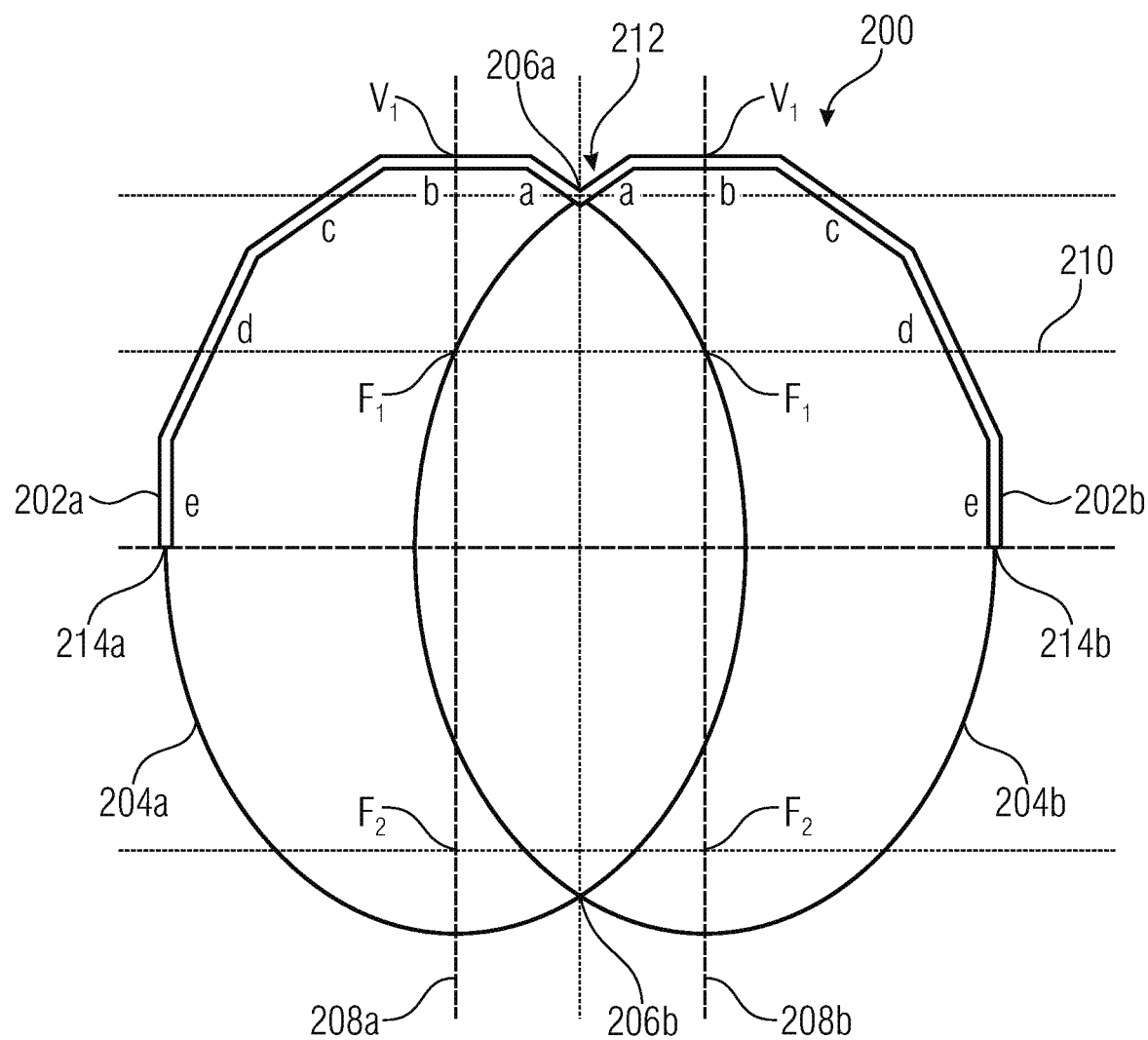
FIG. 2 illustrates a reflector according to an example.

Examples provide a reflector for an energy source and having a structure reducing hot spots, thereby keeping the radiation profile more uniform. FIG. 2 illustrates a reflector 200 according to an example. The reflector 200 includes a first reflector section 202a and a second reflector section 202b. The first reflector section 202a extends along a portion of a first ellipse 204a, and the second reflector section 202b extends along a portion of a second ellipse 204b. The second ellipse 204b intersects the first ellipse 204a at a first intersecting point 206a and at a second intersecting point 206b. The major axes 208a, 208b of the first ellipse 204a and the second ellipse 204b are substantially parallel to each other, and the focal points $F_1$ of the first ellipse 204a and the second ellipse 204b are on a straight line 210 being orthogonal to the two major axes 208a, 208b of the first and second ellipses 204a, 204b. The second focal points $F_2$ of the first and second ellipses 204a, 204b are spaced apart by a distance that substantially corresponds to the distance between the first focal points $F_1$.

The first reflector section 202a and the second reflector section 202b are joined at the first intersecting point 206a of the first ellipse 204a and the second ellipse 204b. The first reflector section 202a and the second reflector section 202b may be directly joined at the first intersecting point 206a, e.g., without additional elements therebetween. In accordance with examples, respective first ends of the first and second reflector sections 202a, 202b are located at the intersecting point 206a and the first ends are joined.

At the first intersecting point 206a a dip 212 is formed in the reflector 200. The reflector 200 is recessed with respect to the reflector parts at the respective vertices $V_1$ of the first and second ellipses 204a, 204b. In other words, the intersecting point 206a of the first ellipse 204a and the second ellipse 204b is located at a position between a first vertex $V_1$ of the first ellipse 204a and the second ellipse 204b and a first focal point $F_1$ of the first ellipse 204a and the second ellipse 204b. In accordance with the example of FIG. 2, the intersecting point 206a is at a position that is closer to the vertices $V_1$ of the ellipses 204a, 204b than to the focal points $F_1$ of the ellipses 204a and 204b. In other examples, the intersecting point may be closer to the focal points than to the vertices.

In the example of FIG. 2, each of the reflector sections 202a, 202b is formed of a plurality of straight sections or elements a to e which are interconnected with each other. The respective straight elements a of the reflector sections 202a and 202b are connected with each other at the intersecting point 206a. The intersecting point 206a may also be referred to as the first end of the first reflector section 202a and as the first end of the second reflector section 202e. The free end of the reflector elements e of the first and second reflector sections 202a and 202b may be referred to as a second or free end 214a, 214b of the first and second reflector sections 202a, 202b.

Figure 3:
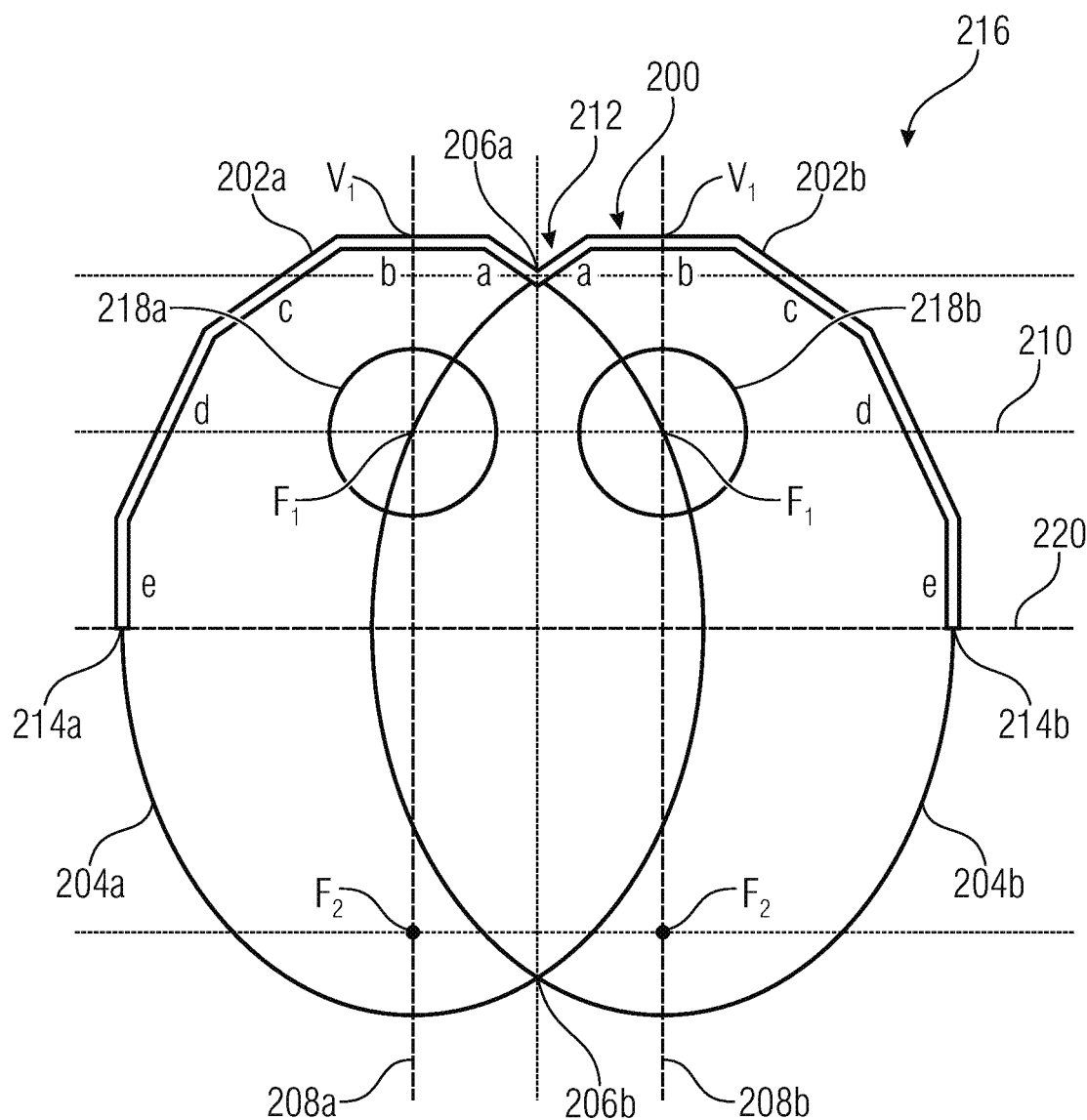
FIG. 3 schematically illustrates an energy source according to an example that may be used in an additive manufacturing system.

Examples provide an apparatus including two radiation elements or lamps arranged beneath a reflector, e.g., a reflector having a structure as described in the example of FIG. 2. FIG. 3 schematically illustrates an energy source according to an example that may be used in an additive manufacturing system. Elements shown and described in FIG. 2 are labeled with the same reference signs and will not be described again in detail. The energy source 216 includes the reflector 200, a first radiation element 218a and a second radiation element 218b. The radiation elements 218a, 218b may include elongated lamps emitting a wavelength spectrum to heat a powder material used in an adhesive manufacturing process, for example in a system as described above with reference to FIG. 1. The first radiating element 218a is located at the first focal point $F_1$ of the first ellipse 204a, and the second radiating element 218b is located at the first focal point $F_1$ of the second ellipse 204b, The first ellipse 204a and the second ellipse 204b are arranged such that the first ellipse 204a intersects the second radiating element 218b, and such that the second ellipse 204b intersects the first radiating element 218a.

The second ends 214a, 214b of the first and second reflector sections 202a, 202b are located at a position below the first and second radiating elements 218a and 218b, The reflector sections 202a and 202b extend from the intersecting point 206a along the respective ellipses 204a, 204b such that the respective second ends 214a and 214b of the reflector sections 202a and 202b are located on the minor axis 220 of the first and second ellipses 204a, 204b. The second ends 214a and 214b are located at the same position along a direction of the major axes 208a, 208b, however, in accordance with other examples, the second ends 214a, 214b may be at different positions. In accordance with other examples, the second ends 214a, 214b may be located above the minor axis 220 to be closer to the radiating elements 218a, 218b or may be located below the minor axis 220 to be further away from the radiating elements 218a, 218b.

The surfaces of the reflector section 202a, 202b reflect radiation generated using the radiating elements 218a, 218b, for example IR radiation or radiation in the visible light.

Figure 4:
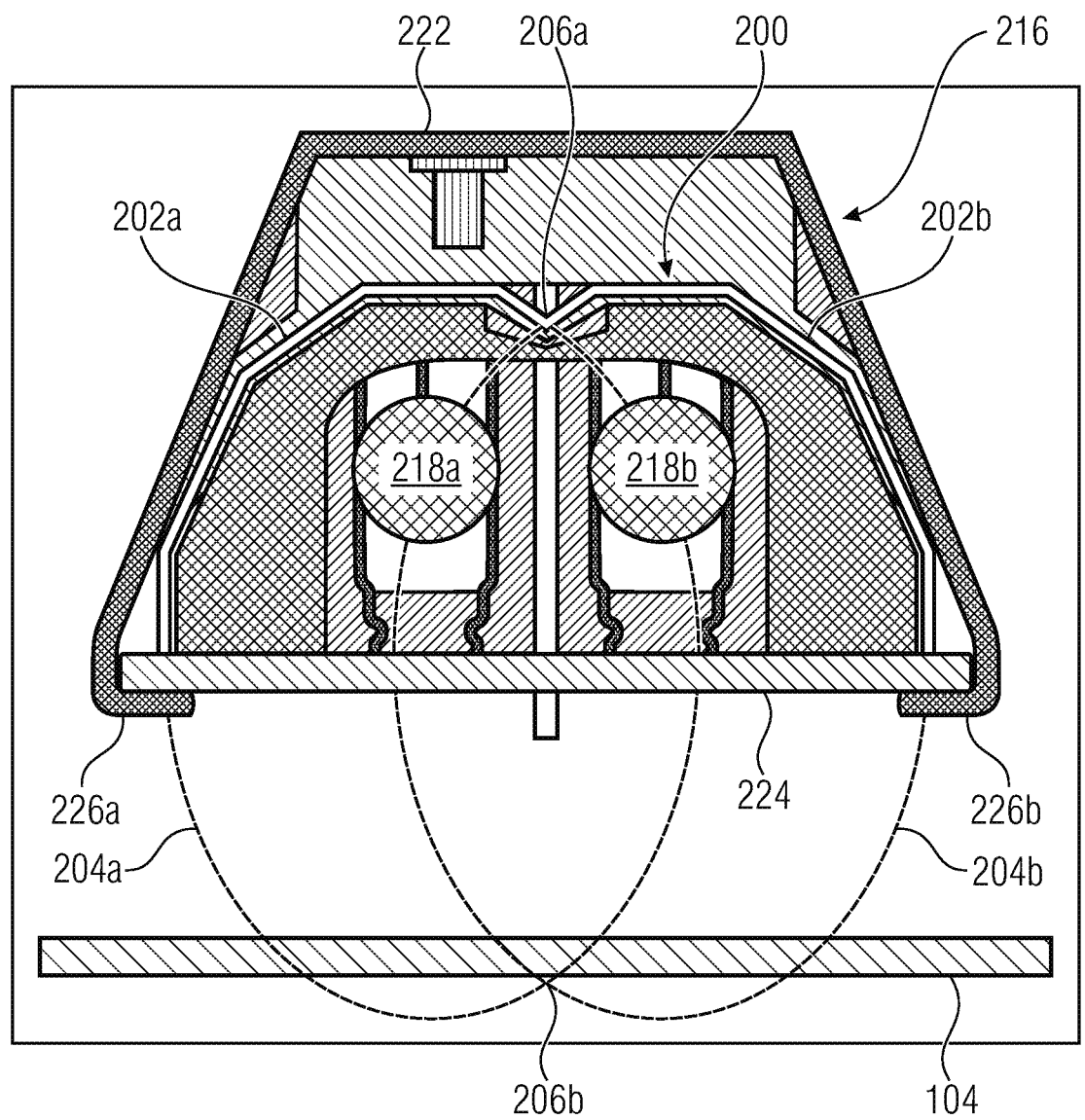
FIG. 4 illustrates an example of an energy source as it may be used in an additive manufacturing system described with reference to FIG. 1.

FIG. 4 illustrates an example of an energy source as it may be used in an additive manufacturing system described above with reference to FIG. 1, Elements shown and described in FIG. 2 and in FIG. 3 are labeled with the same reference signs and will not be described again in detail. FIG. 4 shows the energy source 216 including the two radiating elements or lamps 218a, 218b and the reflector 200 having the reflector sections 202a and 202b. The energy source 216 further includes a housing 222 that may be mounted to a support structure of the additive manufacturing system of FIG. 1, for example, to a support structure provided in a 3D printer. The reflector 200 is mounted in the housing 222. The energy source further comprises a plate 224 that is transparent for the wavelength spectrum emitted using the lamps 218a and 218b so that radiation may be emitted through the plate 224 towards the support member 104 to apply heat to the build material provided on the support member 104 as explained above with reference to FIG. 1. The housing 222 has lower ends 226a, 226b that are bent inwardly so as to provide a mounting location receiving the opposite outer ends of the plate 224.

Figure 5A:
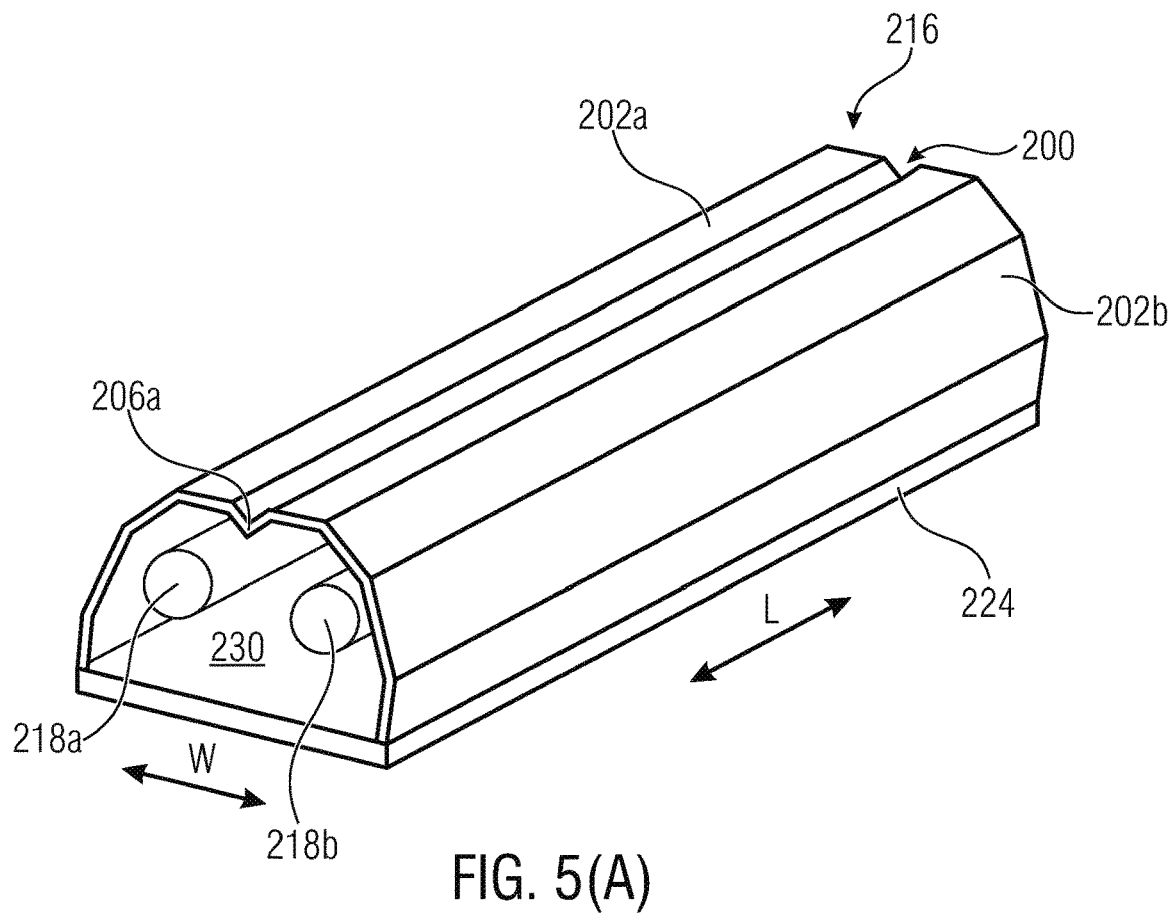
FIG. 5(A) illustrates an isometric view of the energy source of FIG. 4 without the housing.

FIG. 5(A) shows an isometric view of the energy source 216 of FIG. 4 without the housing 222. The radiating elements 218a and 218b include elongated lamps, for example halogen lamps, which are arranged side-by-side beneath the reflector 200 along a width W of the energy source 216. The lamps 218a, 218b extend along the longitudinal direction or length L of the energy source 216. When viewed along the length L, a cross-section of the reflector 200 has the above described structure including the first and second reflector sections 202a, 202b extending along a portion of the two ellipses in the focal points of which the lamps 218a, 218b are arranged, and the two reflector portions 202a and 202b are joined with each other at the intersecting point 206a.

Figure 5B:
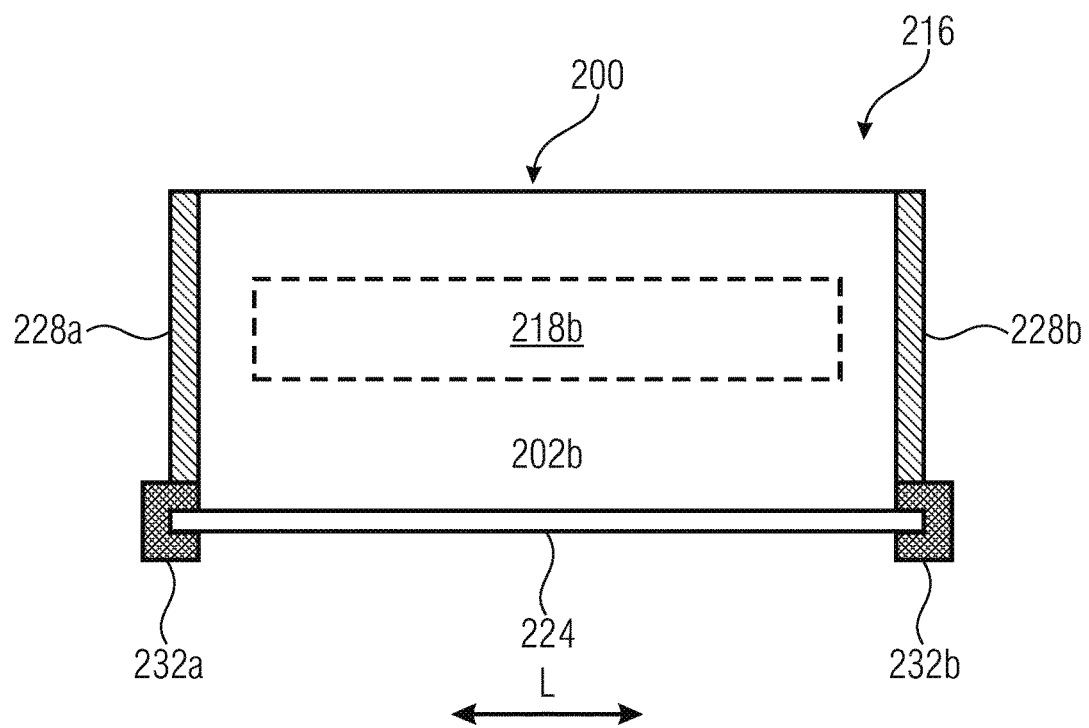
FIG. 5(B) illustrates a side view of the energy source shown in FIG. 5(A)

FIG. 5(B) shows a side view of the energy source 216 shown in FIG. 5(A). The energy source 216 further includes a first end reflector 228a and a second end reflector 228b being located at the opposite ends of the lamps 218a, 218b so as to close a volume 230 defined by the glass plate 224 and the reflector 222 in which the lamps 218a, 218b are located. Each of the end reflectors 228a, 228b may include a fixture 232a, 232b for securing the plate 224.

In an energy source as described above, radiation is focused back onto the lamps using the reflector, thereby increasing the efficiency and creating a Gaussian-like radiation flux. The reflector profile having the two interconnected reflector sections extending along a portion of the respective ellipses reduces hot spots, thereby keeping the radiation profile more uniform. In accordance with examples, also the end reflectors 228a, 228b are provided at the ends of the lamps, reducing cold spots, thereby maintaining the radiation flux at the ends of the lamps to be similar to the radiation flux at the center, thereby providing for a more uniform radiation profile. In accordance with further examples, the plate 224, for example a glass plate, is provided, thereby creating, together with the reflector 200, also referred to as main reflector, and the two end reflectors 228a, 228b the enclosed volume 230 around the lamps 218a, 218b, keeping hot air inside the volume and preventing the lamps from running too cold.

The reflector 200 provides an increased efficiency as the lamps are kept hot due to the reflection of the radiation or energy from the lamps back into the filament of the lamps. A Gaussian-like radiation flux is achieved and losses at the lamp ends are reduced. Further, the reflector 200 allows to operate the energy source at a reduced energy level while maintaining the filament temperature, thereby keeping the desired selectivity with regard to the material to be treated.

The radiation source or energy source may be considered a black body which is held at a constant, uniform temperature using the reflector 200, so that the radiation has a spectrum and intensity depending on the temperature of the body in accordance with Planck's law, i.e., as the temperature decreases, the peak of the black-body radiation curve moves to lower intensities and longer wavelengths. In an additive manufacturing process in which part of the build material is treated with an agent, which is solidified, the radiation is within a defined wavelength range yielding a high absorption of the energy in the treated or printed part of the build material layer. The non-printed or non-treated build material has a lower absorption of the energy within the defined wavelength range. For example, for solidifying the printed part in the build material layer a radiation in the visible range may be provided. When the radiation in this range, the treated build material is heated due to the energy absorption at this wavelength, while the non-treated build material is not heated. Shifting the radiation spectrum into the IR range may cause the non-treated build material to be heated while the treated or printed material is not heated. Thus, the filament temperature of the lamps is to be constant or substantially constant thereby maintaining the defined wavelength range. In accordance with the examples above, the reflector having the two reflector sections causes a part of the radiation to be reflected back into the filament of the lamps, so that constant filament temperature is achieved in each lamp. Also when using one of the two lamps the filament temperature is maintained as in a situation when the two lamps are operated, and this allows to maintain the selectivity with regard to the material treated while reducing the power or energy.

Figure 6:
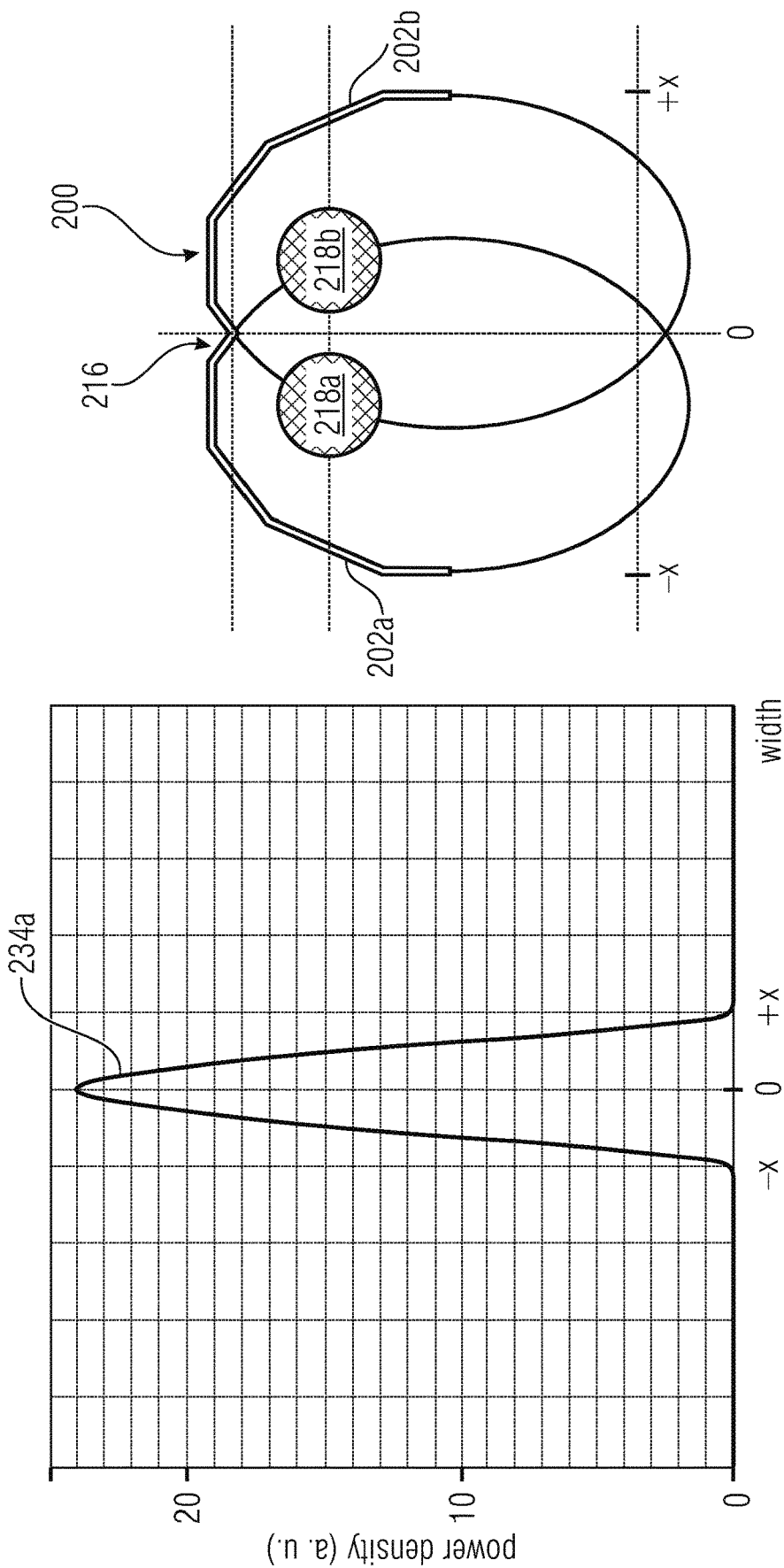

FIG. 6 shows a graph illustrating a power density distribution for the energy source of FIG. 3 having two lamps turned on. The energy source described in accordance with the example of FIG. 3 is represented on the right-hand side, and the two lamps 218a, 218b are turned on as is indicated by the filled circles. The energy source extends in the width direction from −x to +x. In the graph on the left-hand side of FIG. 6 the x-axis indicated the width in arbitrary units, and the y-axis indicated power density in arbitrary units. The graph shows a Gaussian distribution of the power density 234a along the width of the energy source.

Figure 7:
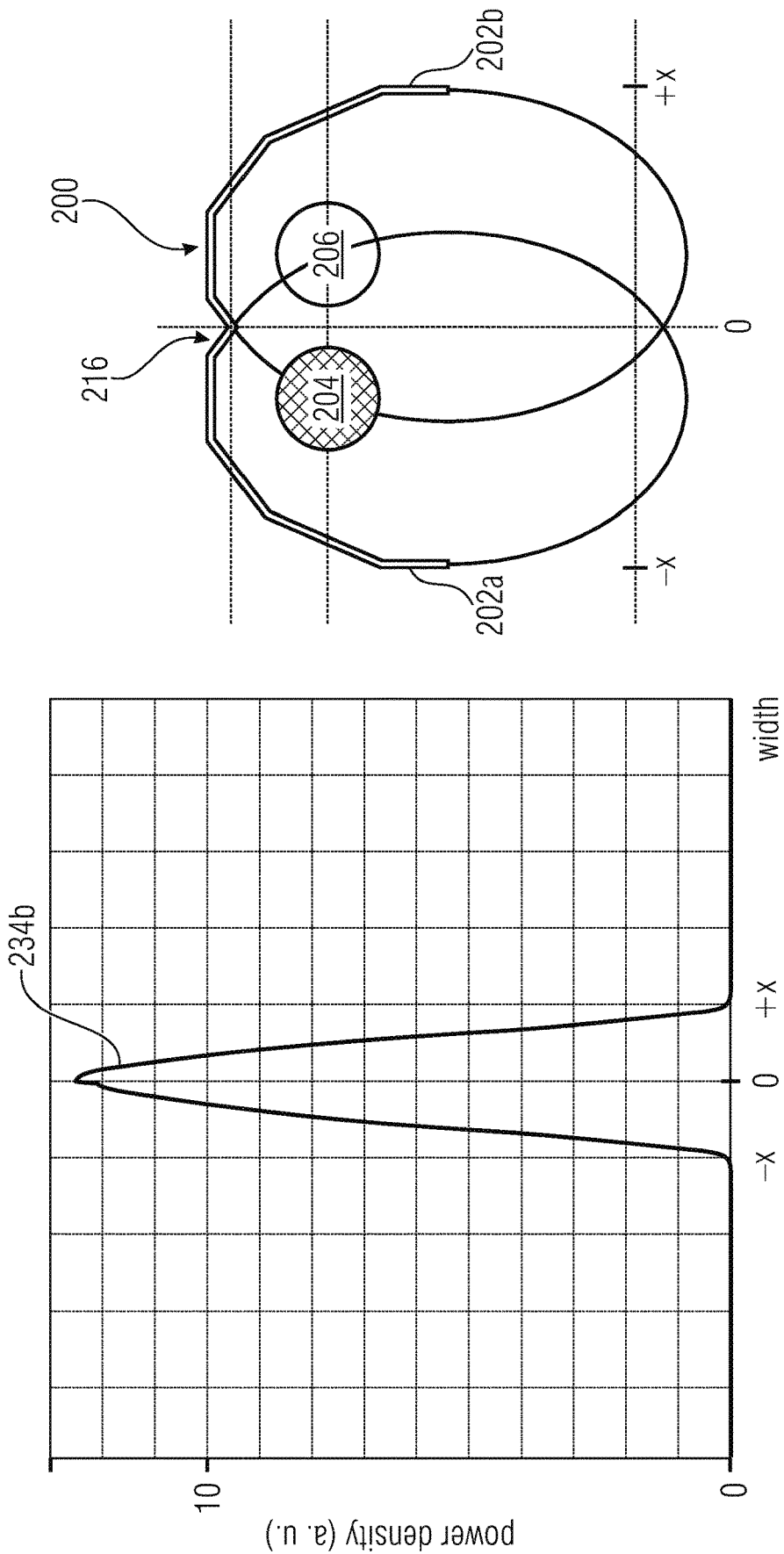

FIG. 7 shows a graph illustrating a power density distribution for the energy source of FIG. 3 having one lamp turned on. The lamp 218a is activated as is shown by the filled circle, while lamp 218b is deactivated, as is shown by the empty circle. The graph shows that the Gaussian distribution 234b of the power density along the width which is substantially the same as in FIG. 6, when the two lamps 218a, 218b are activated, however maximum is substantially one half when compared to the situation in which both lamps, 218a, 218b are activated. Thus, the reflector structure 200 of the energy source 216 allows to switch on or switch off one of the lamps for changing the power density provided by the energy source 216, while maintaining substantially the same Gaussian distribution of the power density along the width of the lamp, and maintaining the same footprint along the width of the energy source, as may be seen from a comparison of FIG. 6 and FIG. 7. At the same time, as explained above, the reflector structure causes a sufficient additional heating of the lamps by reflecting back energy into the filaments of the lamps so that each lamp is kept at a constant filament temperature.

Figure 8:
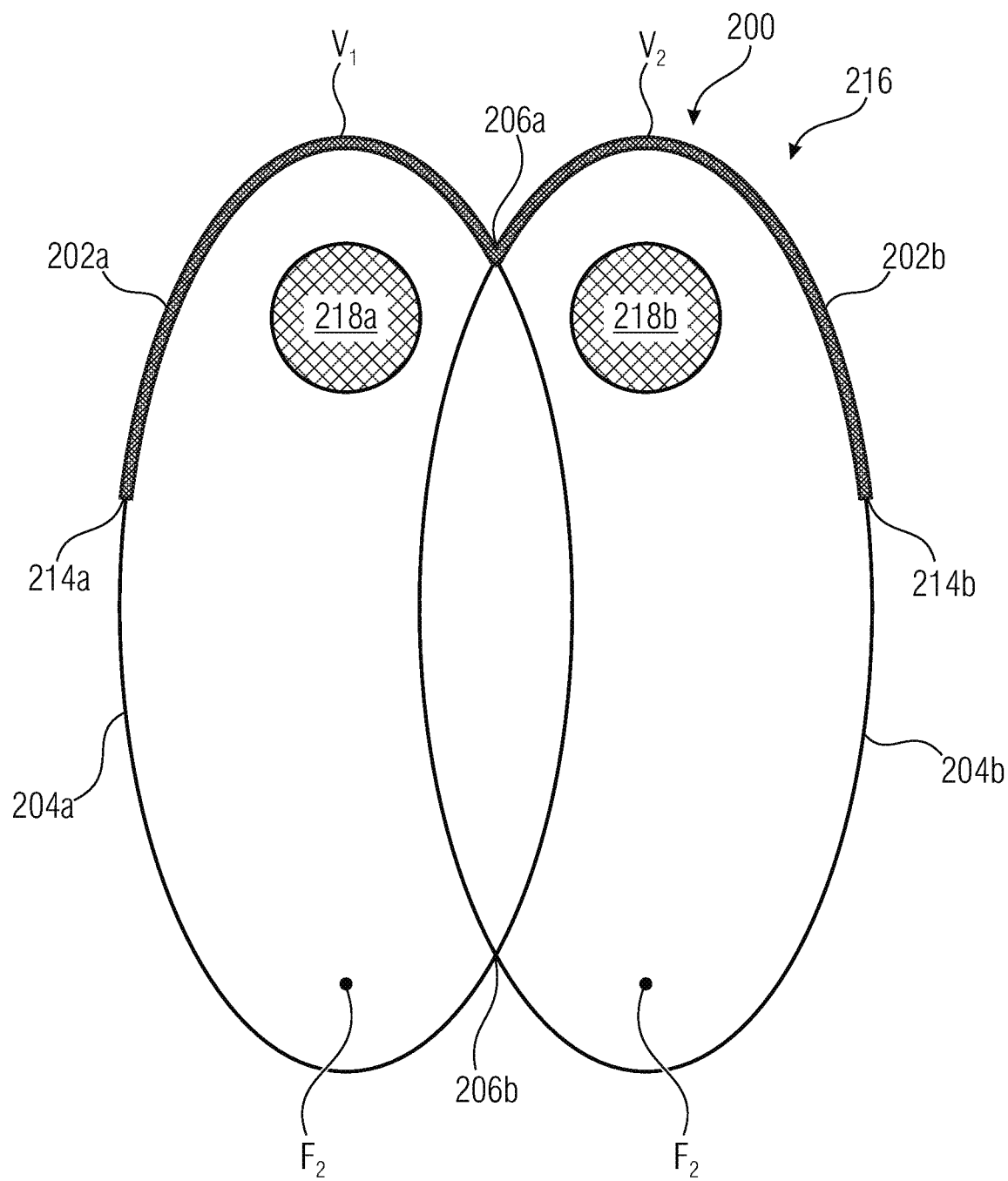
FIG. 8 illustrates an energy source in accordance with another example including continuously bent reflector sections.

FIG. 8 shows an energy source 216 in accordance with another example including continuously bent reflector sections 202a, 202b. Those elements already described with reference to FIG. 3 will not be described again, and the same reference signs are used as in FIG. 3. When compared to FIG. 3, the example of FIG. 8 differs in that the reflector sections 202a and 202b are formed by respective continuously curved sections extending from the respective first ends of the reflector sections 202a, 202b at the intersecting point 206a to the respective second ends 214a, 214b. The ellipses 204a and 204b are arranged to intersect at the intersection points 206a and 206b, however, other than in the FIG. 3 example, the first ellipse 204a does not intersect with the second lamp 218b, and the second ellipse 204b does not intersect with the first lamp 218a, In accordance with the example of FIG. 8, the intersecting point 206a is at a position that is closer to the focal points $F_1$ of the ellipses 204a, 204b than to the vertices $V_1$ of the ellipses 204a, 204b. The lamps 218a, 218b are arranged at the focal points of the ellipses 204a and 204b. The energy source 216 provides the same functionality and has the same properties as explained above.

Figure 9:
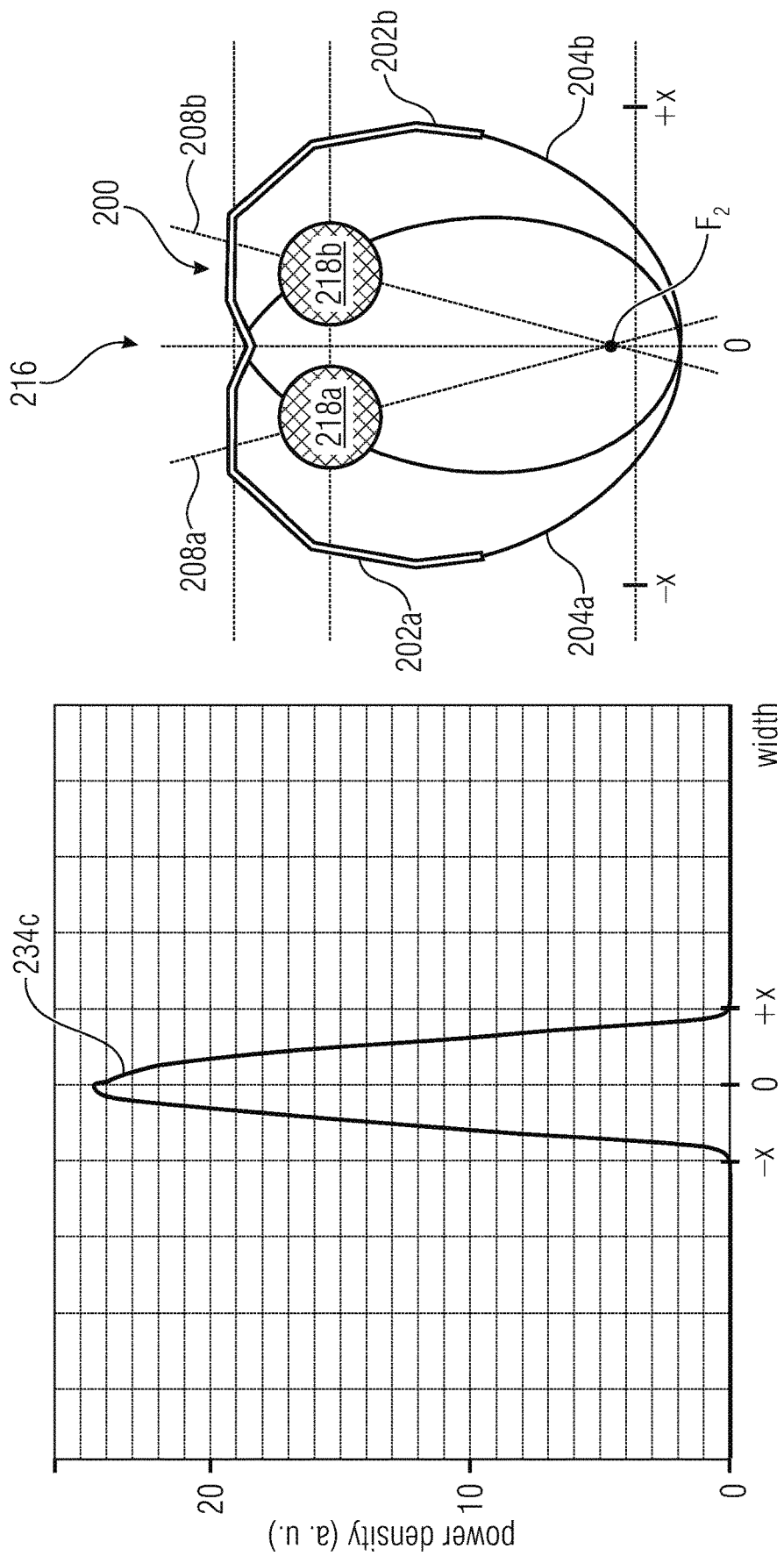
FIG. 9 illustrates an energy source in accordance with another example in which the ellipses are inclined, and a graph representing the power density distribution over the width of the energy source.

In the examples described so far, the ellipses 204a, 204b, along which the respective reflector sections 202a, 202b extend partly, have been arranged such that the major axes 208a, 208b are substantially parallel to each other so that the respective second focal points $F_2$ of the ellipses 204a, 204b are separated from each other by a predefined distance. FIG. 9 shows an energy source 216 in accordance with another example in which the ellipses 204a, 204b are inclined so that the second focal points $F_2$ coincide. FIG. 9 shows in the right-hand portion the energy source 216 corresponding substantially to the one of FIG. 3 except that the ellipses 204a and 204b are arranged such that the respective main axes 208a and 208b are inclined so that the second focal points $F_2$ coincide. The graph shown in FIG. 9 represents the power density distribution over the width of the energy source 216 measured from −x to +x along the x-axis, and the power density is indicated along the y-axis in arbitrary units. The curve 234c represents the power distribution over the width of the energy source 216 assuming that both lamps 218a and 218b are activated, as is represented in FIG. 9 by the filled circles representing the lamps 218a, 218b. When compared to FIG. 6, substantially the same power density is achieved as in a situation in which the major axes of the ellipses are substantially parallel to each other so that the second focal points $F_2$ are separated from each other by a predefined distance. Thus, keeping the major axes substantially parallel to each other or arranged inclined with respect to each other so that the focal points come closer together does not substantially change the properties of the energy source 216 which is provided with the reflector 200.

Figure 10:
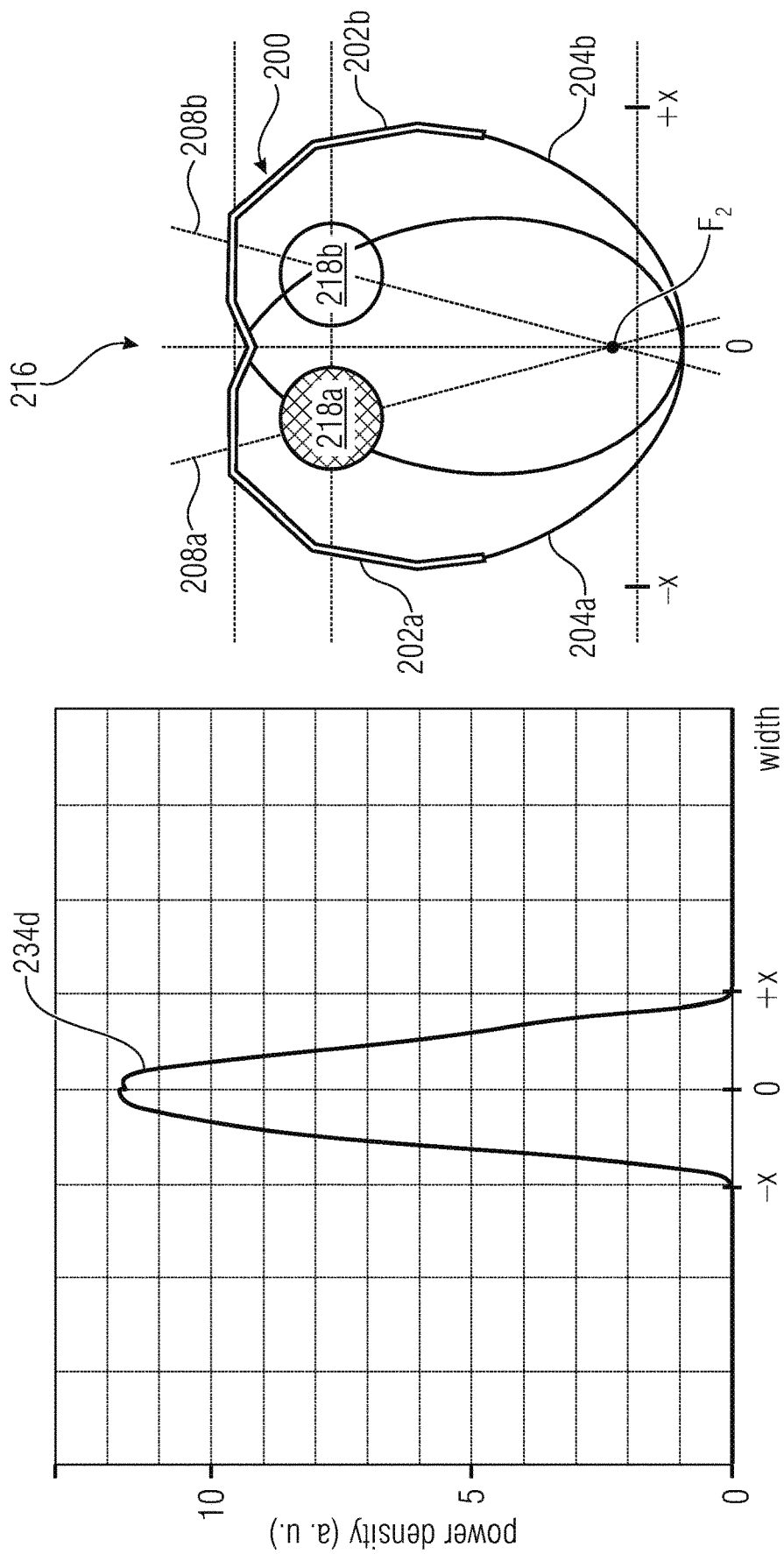
FIG. 10 illustrates the power density distribution for the energy source of FIG. 9 when one of the lamps is activated.

FIG. 10 illustrates the power density distribution for the energy source 216 of FIG. 9 when one of the lamps is activated. The first lamp 218a is activated, and the second lamp 208 is deactivated, as is represented by the empty circle representing the lamp 218b. As may be seen from a comparison of FIG. 9 and FIG. 10, the power density distribution represented by curves 234c and 234d is substantially the same over the width, however, the power density maximum, when using one lamp, is about one half of the maximum when using both lamps. Thus, the energy source in accordance with the example of FIG. 9 and FIG. 10 has substantially the same properties as the previously described examples.

Figure 11:
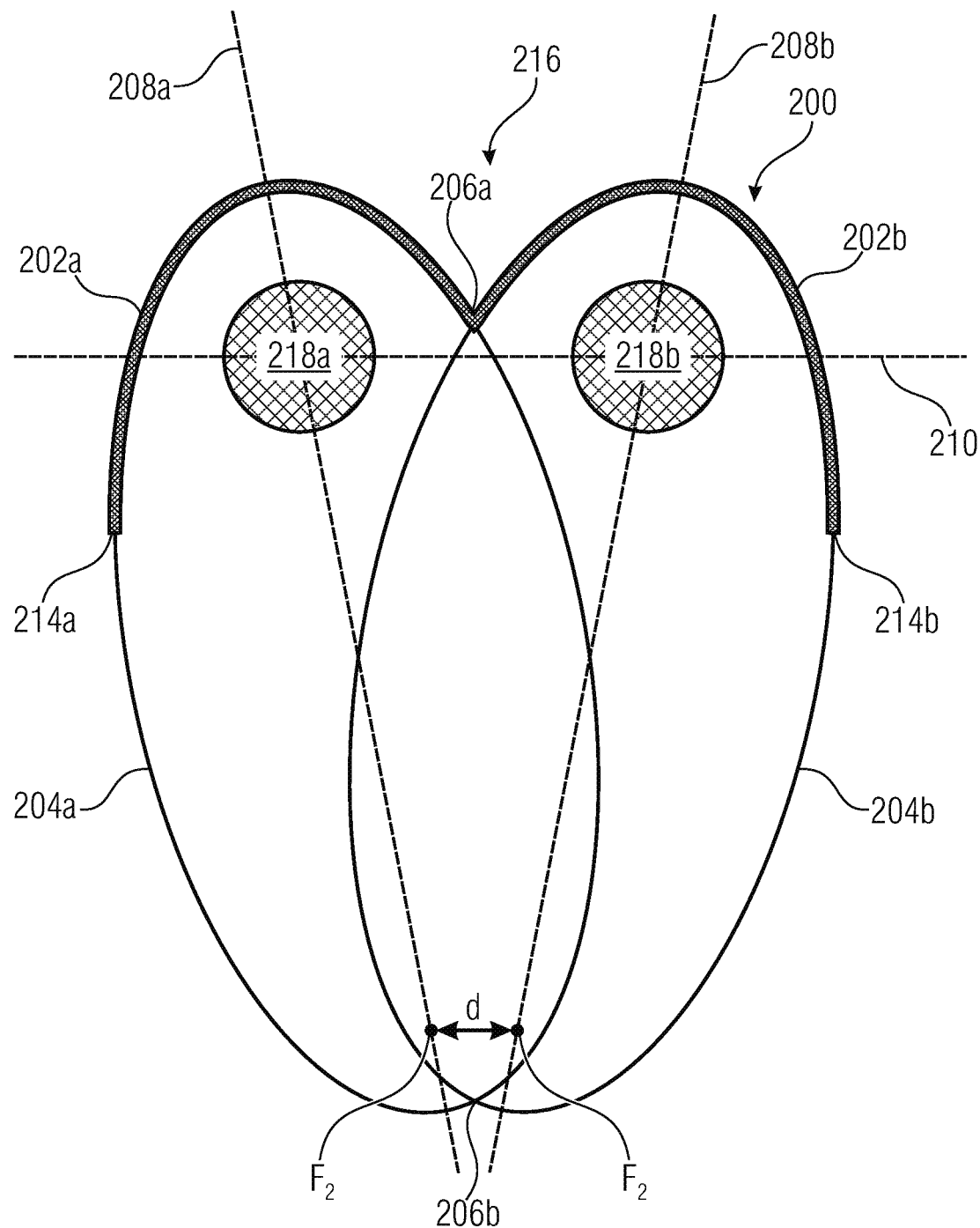
FIG. 11 illustrates an energy source in accordance with an example in which the ellipses are inclined but the second focal points are at a distance from each other.

FIG. 11 shows an energy source 216 in accordance with an example in which the major axes 208a, 208b are inclined but the second focal points $F_2$ are at a distance d from each other. Elements already described earlier are referenced by the same reference signs. When compared to the examples of FIG. 9 and FIG. 10, the ellipses 204a and 204b along which the respective reflector sections 202a and 202b extend are inclined so that the second focal points $F_2$ are closer together than in the example of FIG. 3. The major axes 208a, 208b are inclined such that there remains the distance d along the width direction between the second focal points $F_2$. In the example of FIG. 11, the respective reflector sections 202a and 202b are formed by continuously curved or bent parts. In accordance with other examples, the respective reflector sections 202a and 202b may be formed by a plurality of interconnected linear elements, as described with reference to FIG. 3.

Figure 12:
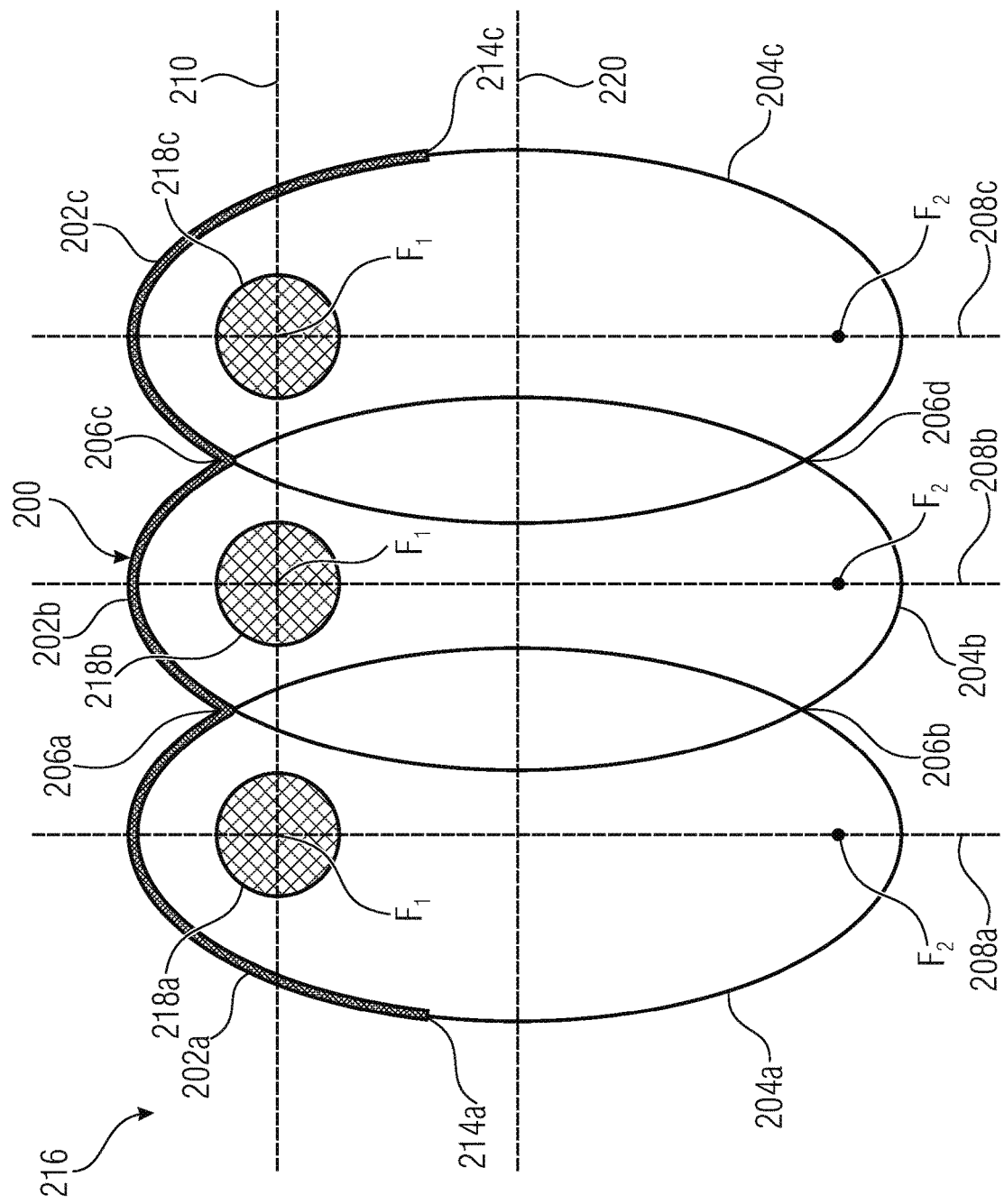
FIG. 12 illustrates an energy source in accordance with an example including three lamps.

In the examples described above, the energy source included two radiating elements or lamps, however, in accordance with other examples more than two lamps may be used. FIG. 12 shows an energy source 216 in accordance with an example including three lamps 208a, 208b, 208c. In FIG. 12, those elements already described with reference to FIG. 3 have associated the same reference signs and will not be described again. In the energy source 216 the reflector 200 includes the first reflector section 202a, the second reflector section 202b and a third reflector section 202c. The reflective reflector sections 202a to 202c are formed by respective continuously bent element. In accordance with other examples, each of the reflector sections 202a to 202c may be formed by a plurality of interconnected linear elements. The third reflector section 202c extends along a part of a third ellipse 204c which intersects with the second ellipse 204b at the intersecting points 206c and 206d. A third radiating element or lamp 218c is arranged beneath the third reflector section 202c so as to be located in the first focal point $F_1$ of the third ellipse 204c. The radiating elements 218a, 218b and 234 are arranged on the straight line 214 being orthogonal to the major axes 208a to 208c of the ellipses 204a to 204c. The second reflector section 202b and the third reflector section 202c are connected with each other at the intersecting point 206c at which the second and third ellipses 204b, 204c intersect. The major axes 208a to 208c of the three ellipses 204a to 204c are arranged substantially parallel to each other so that the respective second focal points $F_2$ are arranged at a distance from each other. The ellipses 204a to 204c are arranged so as to intersect each other without intersecting the respective lamps 218a to 218c. In accordance with other examples, the ellipses 204a to 204c may intersect the respective lamps 218a to 218c in a way similar as shown in FIG. 3. The second ends 214a, 214c may be on, below or above the minor axis 220 of the ellipses 204a to 204c.

Figure 13:
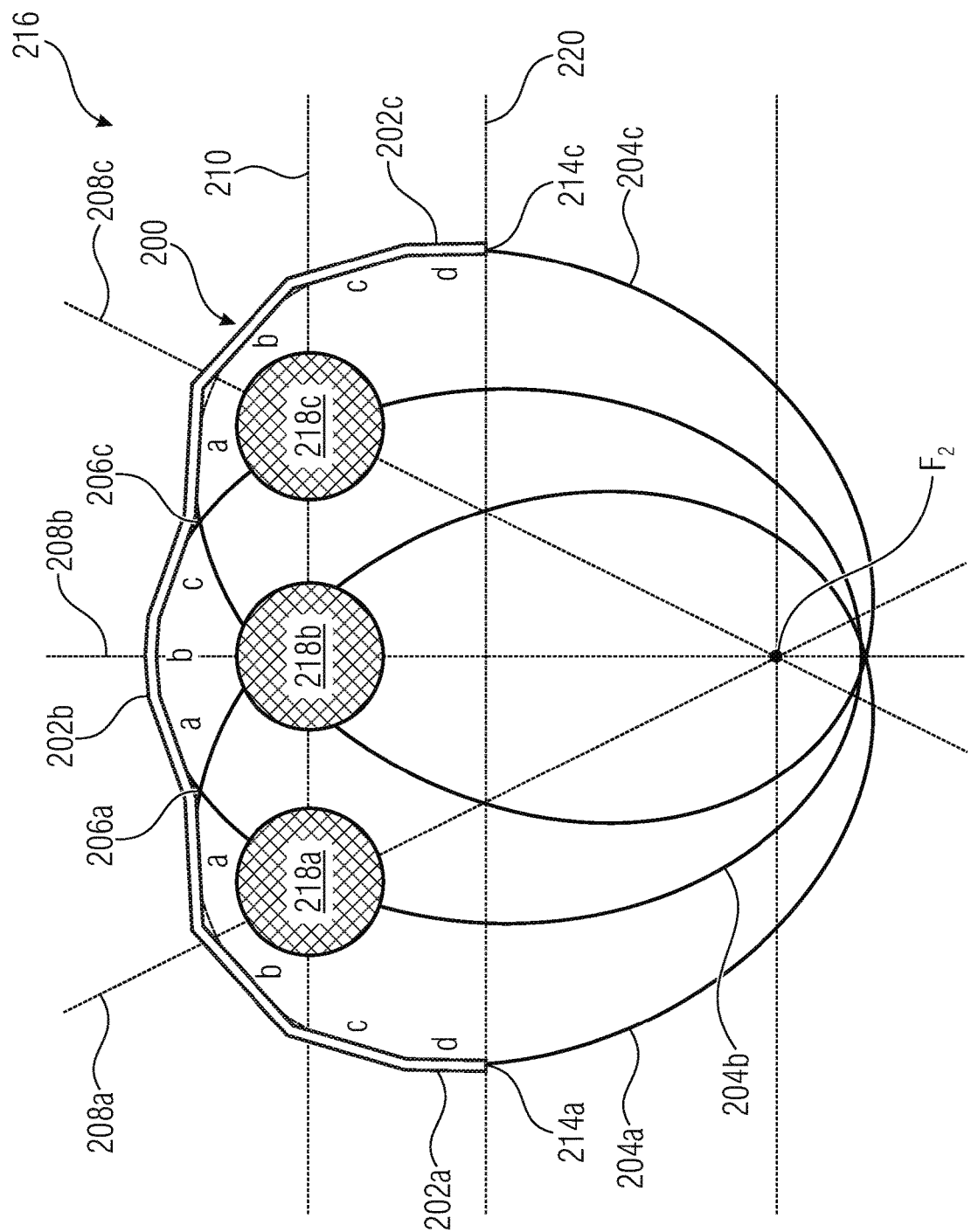
FIG. 13 illustrates an example of an energy source including three radiating elements and reflector sections extending partly along inclined ellipses.

FIG. 13 shows an example of an energy source 216 including three radiating elements 218a to 218c and having reflector sections 202a to 202c extending partly along inclined ellipses 204a to 204c so that the second focal points $F_2$ coincide. When compared to the example of FIG. 12, the respective reflector sections 202a to 202c are formed by a plurality of interconnected straight parts or elements. The first reflector section 202a includes four straight elements a to d extending from the intersecting point 206a at which the first and second ellipses 204a and 204b intersect to the second end 214a of the first reflector section 202a, The third reflector section 202c has substantially the same structure including four linear elements a to d extending from the intersecting point 206c at which the second and third ellipses 204b, 208c intersect to the second end 218c of the third reflector section 202c. The second reflector section 202b extends from the intersecting point 206a to the intersecting point 206c at which the respective reflector sections are connected with each other. The second reflector section 202b includes three straight elements a to c extending from the intersecting point 206a to the intersecting point 210c.

Figure 14:
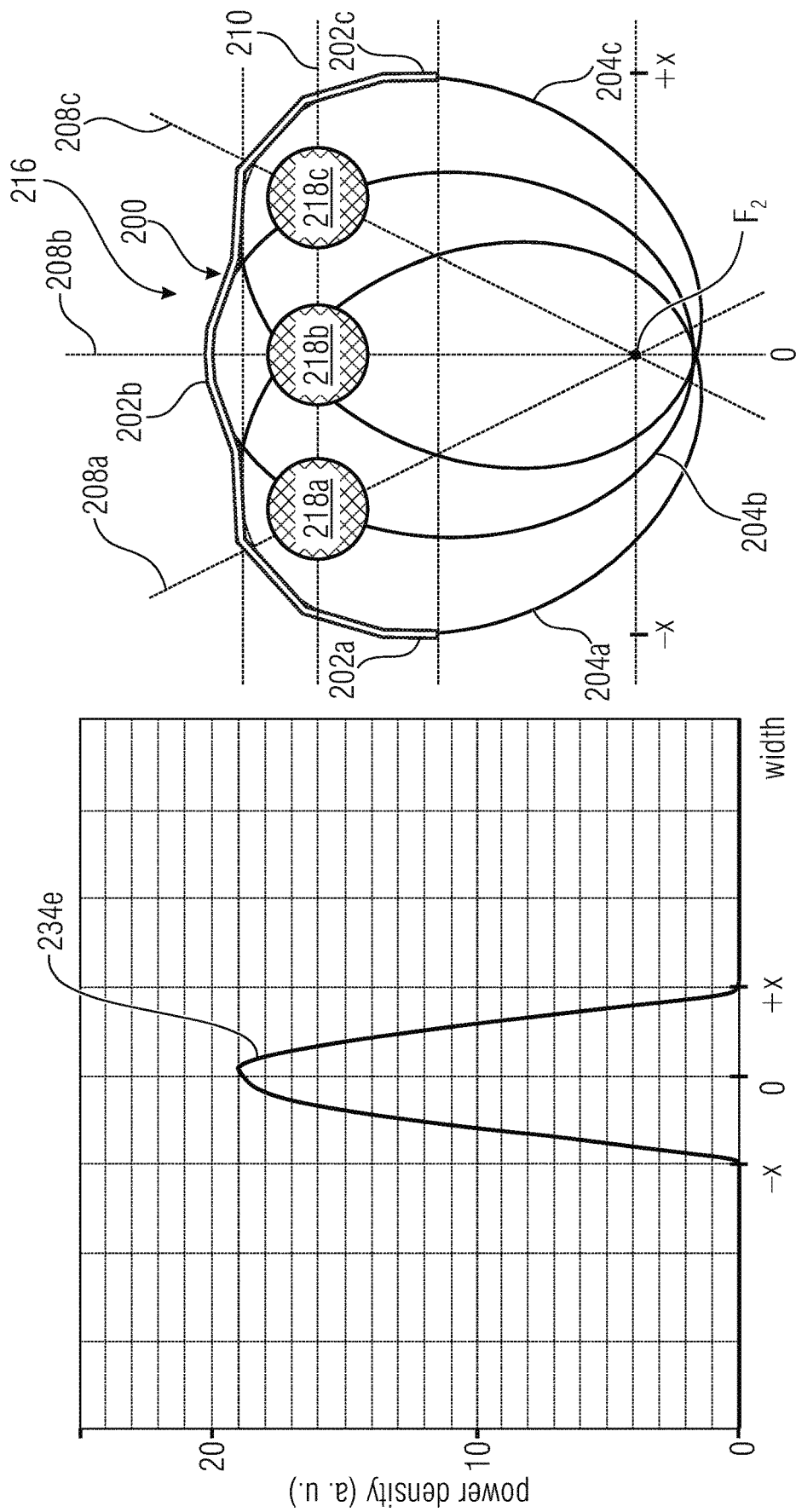
FIG. 14 illustrates a graph representing the power density over the width of the energy source of FIG. 13 with all lamps activated.

FIG. 14 illustrates a graph representing the power density over the width of the energy source 216 of FIG. 13 with all lamps 218a to 218c activated. On the right-hand side, the energy source 216 of FIG. 13 is depicted with all lamps 218a, 218b and 234 being activated, as is represented by the filled circles. The graph represents along the x-axis the width of the energy source 216, and along the y-axis the power density as indicated in arbitrary units. The graph shows a Gaussian distribution 234a of the power density over the width of the energy source 216 when all radiating elements are activated.

Figure 15:
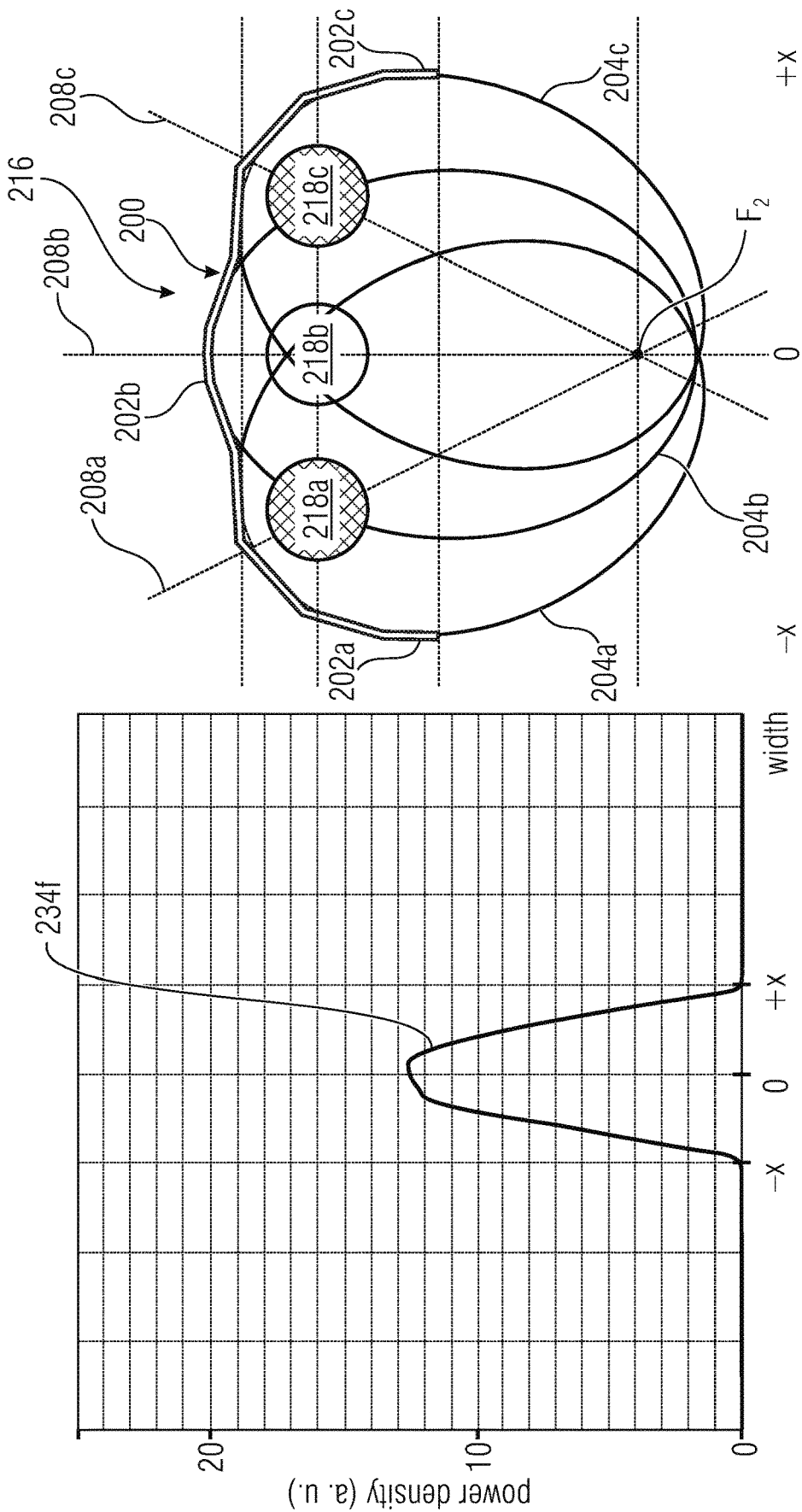
FIG. 15 illustrates a graph representing the power density over the width of the energy source of FIG. 13 with two of the three lamps activated.

FIG. 15 illustrates a graph representing the power density over the width of the energy source 216 of FIG. 13 when two of the three lamps 218a to 218c are activated. The first and third lamps 218a and 218c are activated while the second lamp 218b is deactivated, as is represented by the empty circle. As is shown in the graph, the power density has the Gaussian distribution 234f along the width of the energy source at $\frac{2}{3}$ of the power density when compared to a situation in which all lamps 218a to 218c are activated.

Figure 16:
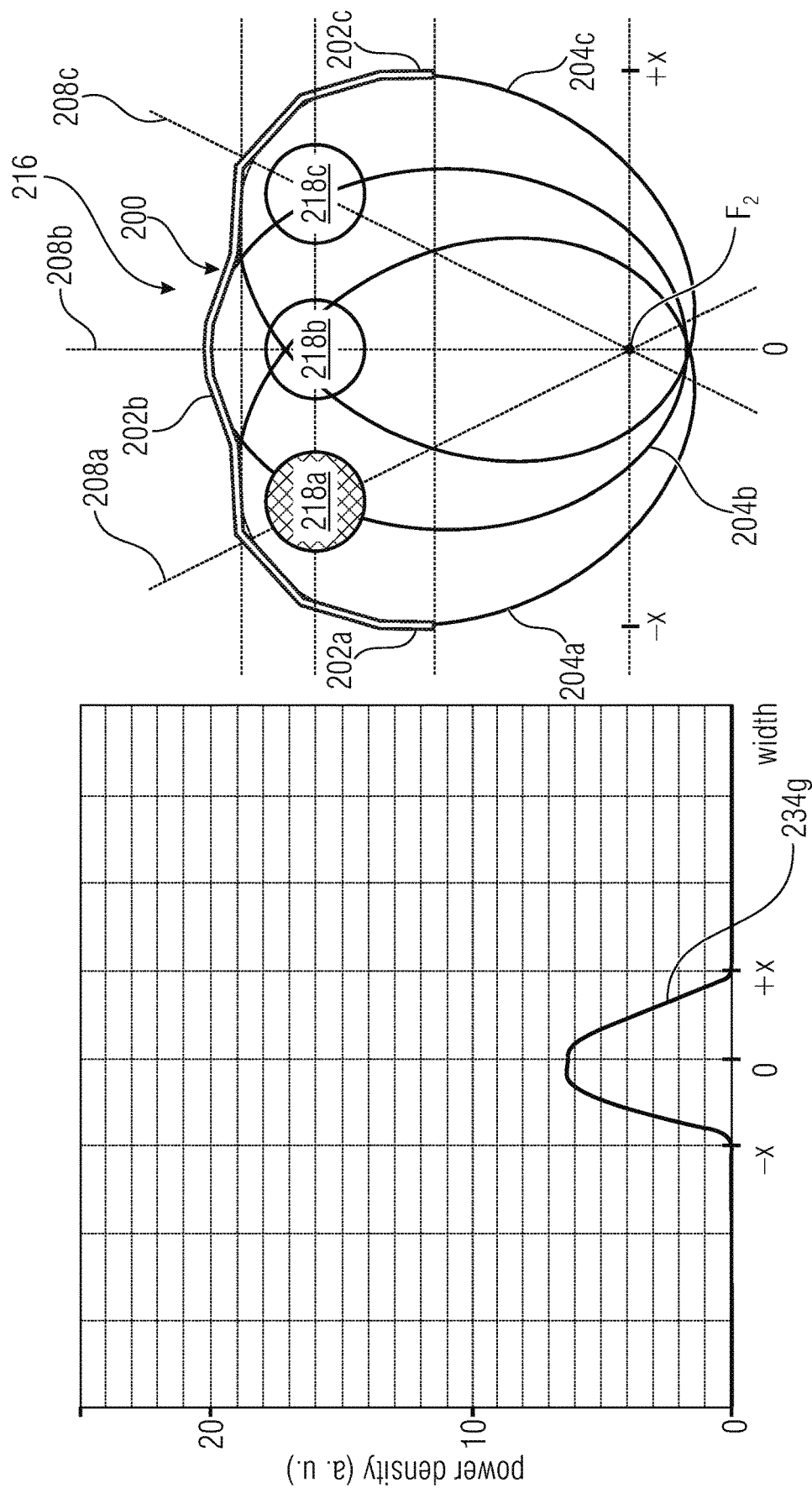
FIG. 16 illustrates a graph representing the power density over the width of the energy source of FIG. 13 with one of the three lamps activated.

FIG. 16 illustrates a graph representing the power density over the width of the energy source 216 of FIG. 13 when one of the three lamps 218a to 218c is activated. The lamb 218a is activated and the lamps 218b, 218c are deactivated, as represented by the empty circles. The graph shows a Gaussian distribution 234g of the power density over the width of the energy source 216 at a power level being about $\frac{1}{3}$ of the power level when all lamps are activated.

The reflector 200 allows to switch on/off the lamps in the energy source while keeping a substantially Gaussian distribution of the power density over the width of the energy source, thereby maintaining the footprint of the radiation. In each of the radiating elements or lamps, due to the reflection of radiation back into the lamp by the reflector, the filament temperature remains the same, thereby maintaining the wavelength of the energy source and its selectivity, thereby allowing for a control or a change of the power density to different levels without changing the selectivity with respect to the material to be heated.

All of the features disclosed in this specification, including any accompanying claims, abstract and drawings, and/or all of the method bucks or processes so disclosed may be combined in any combination, except combinations where at least some of the features are mutually exclusive. Each feature disclosed in this specification, including any accompanying claims, abstract and drawings, may be replaced by alternative features serving the same, equivalent or similar purpose, unless expressly stated otherwise. Thus, unless expressly stated otherwise, each feature disclosed is an example of a generic series of equivalent or similar features.

The invention claimed is:

1. A reflector, comprising:
    a first reflector section; and
    a second reflector section,
    wherein the first reflector section extends along a portion of a first ellipse, and the second reflector section extends along a portion of a second ellipse, the second ellipse intersecting the first ellipse,
    wherein the first reflector section and the second reflector section are joined at an intersecting point of the first ellipse and the second ellipse and wherein a first focal point of the first ellipse lies on the second ellipse and a first focal point of the second ellipse lies on the first ellipse.

2. The reflector of claim 1, wherein the intersecting point of the first ellipse and the second ellipse is located at a position between a first vertex of the first ellipse and the second ellipse and the first focal point of the first ellipse and the second ellipse.

3. The reflector of claim 1, wherein each of the first reflector section and the second reflector section is formed of a continuously curved section.

4. The reflector of claim 1, wherein each of the first reflector section and the second reflector section includes a plurality of straight sections, the straight sections connected with each other.

5. The reflector of claim 1, wherein a major axis of the first ellipse and a major axis of the second ellipse are parallel to each other.

6. The reflector of claim 1, wherein a major axis of the first ellipse and a major axis of the second ellipse are inclined with respect to each other so that a second focal point of the first ellipse and a second focal point of the second ellipse are located closer to each other than the first focal point of the first ellipse and the first focal point of the second ellipse.

7. The reflector of claim 6, wherein the major axes of the first ellipse and the second ellipse are inclined with respect to each other such that the second focal points coincide.

8. An apparatus, comprising:
a reflector of claim 1;
a first radiating element; and
a second radiating element,
wherein the first radiating element is located at a first focal point of the first ellipse, and the second radiating element is located at a first focal point of the second ellipse.

9. The apparatus of claim 8, wherein
each of the first reflector section and the second reflector section includes a first end and a second end,
the first ends of the first reflector section and the second reflector section are joined at the intersecting point of the first ellipse and the second ellipse, and
the second ends of the first reflector section and the second reflector section are located at a position below the first radiating element and the second radiating element.

10. The apparatus of claim 9, wherein the second ends of the first reflector section and the second reflector section are located at the same position below the first radiating element and the second radiating element.

11. The apparatus of claim 8, comprising
a first end reflector located at a first end of the first radiating element and the second radiating element;
a second end reflector located at a second end of the first radiating element and the second radiating element, the first end reflector and the second end reflector arranged traverse to the reflector; and
a plate located below the first radiating element and the second radiating element, the plate being transparent to a wavelength spectrum emitted by the first radiating element and the second radiating element,
wherein the reflector, the first end reflector, the second end reflector and the plate are arranged to form an enclosed volume around the first radiating element and the second radiating element.

12. The apparatus of claim 8, wherein
the first radiating element includes a first elongated lamp to emit a wavelength spectrum to heat a powder material used in an additive manufacturing process,
the second radiating element includes a second elongated lamp to emit a wavelength spectrum to heat the powder material, and
the first elongated lamp and the second elongated lamp are located beneath the reflector and extend side by side along the longitudinal direction.

13. The apparatus of claim 8, comprising
a third radiating element,
wherein the reflector includes a third reflector section,
wherein the third reflector section extends along a portion of a third ellipse, the third ellipse intersecting the second ellipse,
wherein the third radiating element is located at a first focal point of the third ellipse, and
wherein the second reflector section and the third reflector section are joined at an intersecting point of the second ellipse and the third ellipse.

14. The apparatus of claim 8, wherein there is a clear line of sight between the first radiating element and the second radiating element such that the first radiating element and the second radiating element heat each other so as to reduce hot spots.

15. The reflector of claim 1, further comprising a plate covering an opening of the reflector such that hot air is retained in the reflector.

16. The reflector of claim 1, wherein a first focal point of the first ellipse proximal to the first reflector section and a first focal point of the second ellipse proximal to the second reflector have an open air path between them.

17. An additive manufacturing system, comprising:
a build module to build a 3D object from a build material; and
an energy source to apply energy to the build material to cause a solidification of printed portions of the build material,
wherein the energy source includes
a reflector;
a first radiating element; and
a second radiating element,
wherein the reflector includes a first reflector section and a second reflector section,
wherein the first reflector section extends along a portion of a first ellipse, and the second reflector section extends along a portion of a second ellipse, the second ellipse intersecting the first ellipse,
wherein the first radiating element is located at a first focal point of the first ellipse and is on the second ellipse, and the second radiating element is located at a first focal point of the second ellipse and is on the first ellipse, and
wherein the first reflector section and the second reflector section are joined at an intersecting point of the first ellipse and the second ellipse.

18. The reflector of claim 17, further comprising end reflectors located at opposite ends of the reflector.

19. The reflector of claim 18, further comprising a plate to covering an opening of the reflector.

* * * * *